(12) United States Patent
Evans et al.

(10) Patent No.: US 6,600,739 B1
(45) Date of Patent: Jul. 29, 2003

(54) METHOD AND APPARATUS FOR SWITCHING AMONG A PLURALITY OF UNIVERSAL SERIAL BUS HOST DEVICES

(75) Inventors: Keith M. Evans, San Jose, CA (US); Kevin P. Grundy, Fremont, CA (US); Craig B. Owens, San Carlos, CA (US)

(73) Assignee: Hughes Electronics Corporation, El Segundo, CA (US)

( * ) Notice: Subject to any disclaimer, the term of this patent is extended or adjusted under 35 U.S.C. 154(b) by 0 days.

(21) Appl. No.: 09/327,214

(22) Filed: Jun. 7, 1999

(51) Int. Cl.⁷ ............................................... H04L 12/50
(52) U.S. Cl. ....................................... 370/362; 710/313
(58) Field of Search ................................ 370/362, 360; 710/100, 313, 316

(56) References Cited

U.S. PATENT DOCUMENTS

| | | | |
|---|---|---|---|
| 5,784,581 A | | 7/1998 | Hannah |
| 6,064,554 A | * | 5/2000 | Kim .............................. 361/64 |
| 6,131,135 A | * | 10/2000 | Abramson et al. ........... 710/126 |
| 6,308,239 B1 | * | 10/2001 | Osakada et al. ............. 710/131 |
| 6,324,605 B1 | * | 11/2001 | Rafferty et al. .............. 710/100 |
| 6,415,343 B1 | * | 7/2002 | Fensore et al. .............. 710/104 |

* cited by examiner

Primary Examiner—Ken Vanderpuye
(74) Attorney, Agent, or Firm—V. D. Duraiswamy; M. W. Sales

(57) ABSTRACT

A switching device and method for selecting among a plurality of hosts on a bus, such as a Universal Serial Bus (USB). The switching device includes a first hub to be coupled to first host controller and a second hub to be coupled to second host controller. A first selection device is to be coupled to a first peripheral device and the first and second hub devices. The first selection device is to selectively couple the first peripheral device to one of the first and second host devices in response to a selection signal. A second selection device is to be coupled to a second peripheral device and the first and second hub devices. The second selection device is to selectively couple the second peripheral device to one of the first and second host controllers in response to the selection signal. The selection signal is generated in response to one of the host controllers. During the switching process among the host controllers and peripheral devices, a cable disconnect and reconnect between the host controllers and peripheral devices is emulated.

18 Claims, 2 Drawing Sheets

METHOD AND APPARATUS FOR SWITCHING AMONG A PLURALITY OF UNIVERSAL SERIAL BUS HOST DEVICES

BACKGROUND OF THE INVENTION

1. Field of the Invention

The present invention generally relates to switching host devices on a communications bus, and more specifically, the present invention relates to switching host devices on a Universal Serial Bus (USB).

2. Background Information

Various types of communications links and communications protocols are used to interconnect devices and allow interconnected devices to communicate with one another. Communications links utilize different methods for controlling the flow of instructions and data between interconnected devices. For example, one device may operate as a host device of the communications link while other devices operate as peripheral devices on the communications link. In this configuration, the host device may issue commands and tokens on the communications link, which permits the peripheral devices to communicate. If a particular peripheral device does not receive an appropriate command or token, then the peripheral device does not transmit on the communications link. Thus, a single host device controls the flow of commands and data on the communications link.

Another configuration provides peer-to-peer interconnections between various devices on a communications link. In this configuration, the devices are not identified as either a host device or a peripheral device. Instead, each devices capable of issuing commands and data on the communications link without requiring "permission" from another device.

One particular system for interconnecting devices is provided by the Universal Serial Bus (USB) standard. USB is a useful system for connecting a series of peripheral devices or USB functions to a computer. The USB utilizes a USB host controller contained within a personal computer (PC) or other computing device. The USB host controller operates as the USB host device or master and controls other USB slave devices or USB functions connected to the USB. To illustrate, FIG. 1 is a block diagram illustrating a USB host device 103 coupled to a plurality of USB functions 115, 117 and 119 through a USB hub 107. All data flow on the USB is controlled or monitored by the USB host device 103. The USB host device 103 issues tokens and commands to the attached USB functions 115, 117 and 119 giving permission to transmit on the USB.

The USB specification provides for a computer (e.g. a personal computer) as the host device, issuing tokens and commands to all USB functions. The USB specification does not provide for USB functions that are shared among multiple hosts. In addition, the USB specification does not address the issue of providing communications between USB functions when a USB host controller is removed or is not active (e.g. turned off). Thus, when a USB host device is removed or deactivated, the USB functions 115, 117 and 119 are no longer able to communicate. Furthermore, the USB specification does not provide a system for switching control of the USB among USB host devices to enable a USB function to be available to the particular USB host device that needs to communicate with the USB function.

SUMMARY OF THE INVENTION

The present invention provides USB switching device including a first hub device to be coupled to a first host device and a second hub device to be coupled to a second host device. The switching device also includes a first selection device coupled to a first peripheral device and the first and second hub devices. The first selection device is to selectively couple the first peripheral device to one of the first and second host devices in response to a selection signal. The switching device also includes a second selection device coupled to a second peripheral device and the first and second hub devices. The second selection device is to selectively couple the second peripheral device to said one of the first and second host devices in response to the selection signal. Additional features and benefits of the present invention will become apparent from the detailed description, figures and claims set forth below.

BRIEF DESCRIPTION OF THE DRAWINGS

The present invention is illustrated by way of example and not limitation in the accompanying figures.

DETAILED DESCRIPTION

A method and an apparatus providing a USB switching apparatus is disclosed. In the following description numerous specific details are set forth in order to provide a thorough understanding of the present invention. It will be apparent, however, to one having ordinary skill in the art that the specific detail need not be employed to practice the present invention. In other instances, well-known materials, methods, procedures, components and circuits have not been described in detail in order to avoid obscuring the present invention.

For illustration purposes, the present invention will be described as used in a Universal Serial Bus (USB) configuration. However, those skilled in the art will appreciate that the present invention is applicable to any protocol or system for interconnecting various devices. Furthermore, the present invention may be utilized with all variations and extensions of USB, or the like.

The present invention is related to a system for providing multiple host devices to be switched to control peripheral devices over a communications link such as a USB. Therefore, peripheral devices may be shared by a plurality of hosts in accordance with the teachings of the present invention. In addition, if a primary host device on the communications link is deactivated, a secondary host device on the communications link may take control. Thus, peripheral devices on the communications link will continue to have the ability to communicate.

Figure 1:
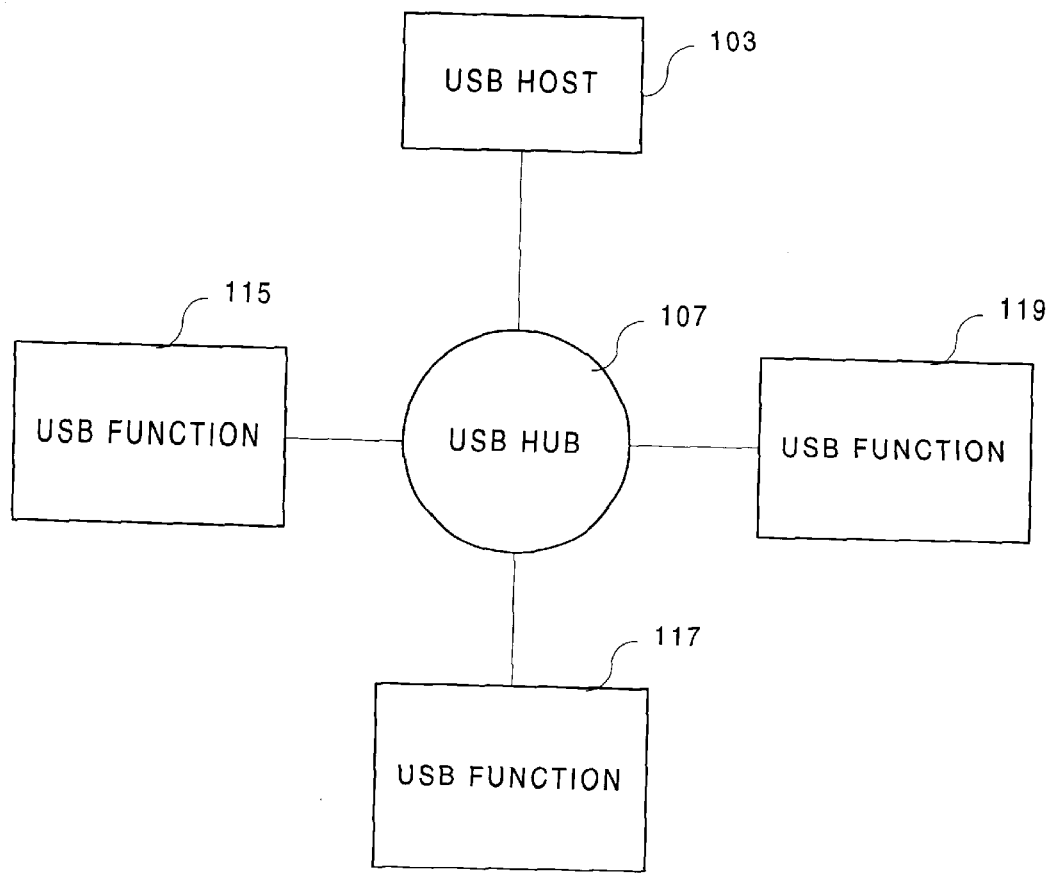
FIG. 1 is an illustration of a block diagram of a host device and a plurality of USB functions coupled together through USB.
Figure 2:
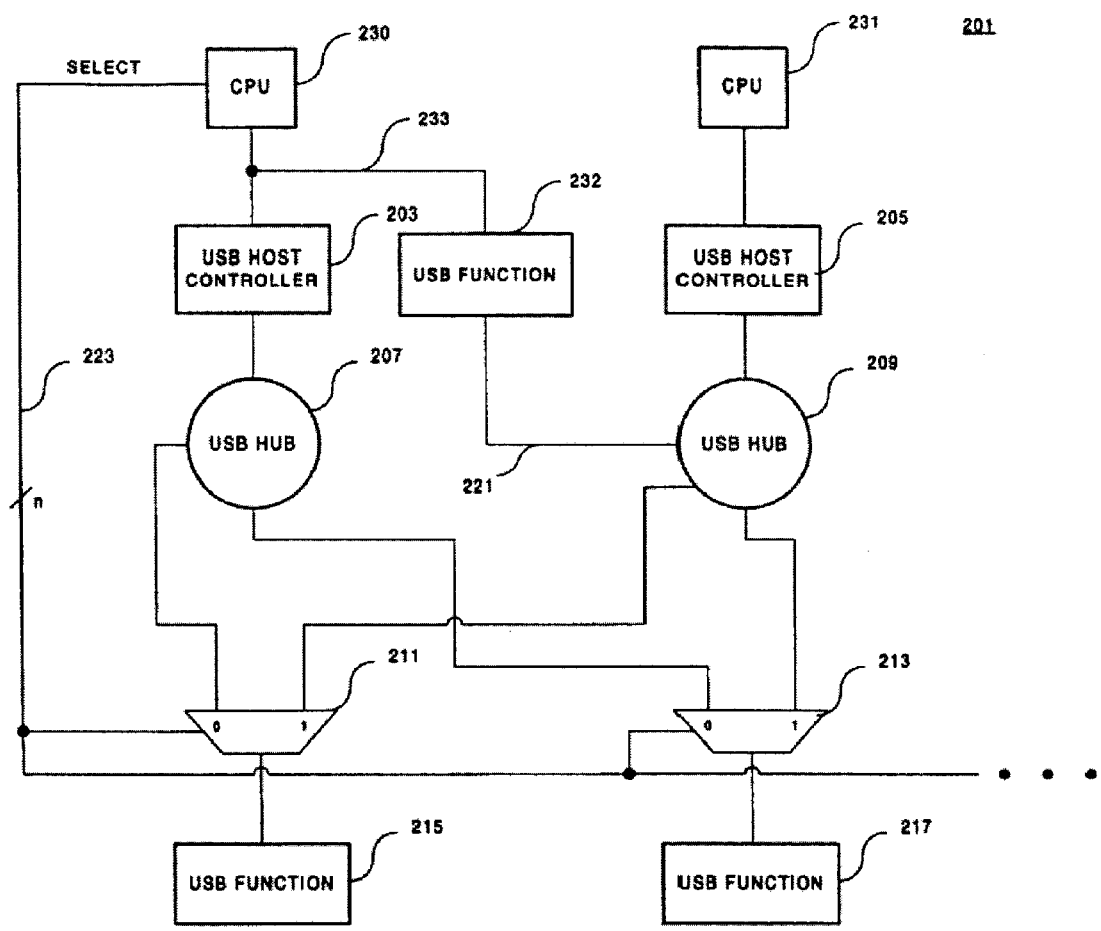
FIG. 2 is an illustration of one embodiment of a switching device in accordance with the teachings of the present invention.

Referring to FIG. 2, one embodiment of a communications link configuration 201 is illustrated in accordance with the teachings of the present invention. In one embodiment, configuration 201 includes USB devices. As illustrated, a central processing unit (CPU) 230 is coupled to a USB host controller 203 and CPU 231 is coupled to USB host controller 205. In one embodiment, CPU 230 is coupled to USB host controller 203 through a processor bus 233 and CPU 231 is coupled to USB host controller 205 through processor bus 234. In one embodiment, USB host controllers 203 and 205 are implemented as combinations of hardware, software or firmware. A downstream port of a USB host controller 203 is coupled to an upstream port of a USB hub 207. In one embodiment, USB hub 207 is a root hub and is integrated with the host system to provide one or more attachment points to the USB. A downstream port of USB host controller 205 is coupled to an upstream port of a USB hub 209.

In one embodiment, downstream ports of USB hub 207 are coupled to upstream "0" ports of the selection devices 211 and 213, respectively. Downstream ports of USB hub 209 are coupled to upstream "1" ports of the selection devices 211 and 213, respectively. A downstream port of selection device 211 is coupled to an upstream port of a USB function 215 and a downstream port of selection device 213 is coupled to an upstream port of USB function 217. In one embodiment, USB functions 215 and 217 are devices that may provide additional capabilities to a computer system, such as for example but not limited to an ISDN connection, a digital joystick, speakers, a scanner, digital camera, etc.

As illustrated, CPU 230 in one embodiment generates a select signal 223 coupled to selection devices 211 and 213. In one embodiment, select signal 223 includes a bus having n signals, where n is greater than or equal to one. In one embodiment, selection device 211 selectively couples USB function 215 to either USB hub 207 or USB hub 209 in response to select signal 223. The selection device 213 selectively couples USB function 217 to either USB hub 207 or USB hub 209 in response to select signal 223. Thus, in one embodiment, USB functions 215 and 217 are selectively coupled to either USB host controller 203 or USB host controller 205 in response to select signal 223.

It is appreciated that the configuration illustrated in FIG. 2 is provided for explanation purposes only and that there may be additional USB host controllers and/or a greater or fewer number of USB functions in accordance with the teachings of the present invention.

During operation, assume that USB host controller 205 controls USB functions 215 and 217. In this example, USB host controller 205 may be considered the primary host device and USB host controller 203 may be considered the secondary host device. As such, USB host controller 203 generates a select signal 223 via CPU 230 to enable USB functions 215 and 217 to be coupled to USB host controller 205 through the "1" upstream ports of selection devices 211 and 213. Therefore, USB functions 215 and 217 may communicate with one another through USB host controller 205.

Assume further that USB host controller 203 needs to control USB functions 215 and 217 or that USB host controller 205 is deactivated or disconnected from USB hub 209. In a prior art USB configuration, USB functions 215 and 217 could not be controlled by USB host controller 203. Moreover, USB functions 215 and 217 would no longer be able to communicate over the USB if USB host controller is deactivated, even though the peripheral devices may still be active. However, in one embodiment, secondary USB host controller 203 may take control of the USB bus.

In addition, USB host controller 203 may monitor the status of primary USB host controller 205 over a link 221. As illustrated, link 221 in one embodiment is a link between a USB function 232 and USB hub 209. USB function 232 is coupled to CPU 230 and USB host controller 203 through processor bus 233. When secondary USB host controller 203 detects that primary USB host controller 205 is no longer available to control the USB, USB host controller 203 has select signal 223 updated to take control of the USB. In particular, select signal 223 is updated to allow USB host controller 203 to take control of the USB. In this case, USB functions 215 and 217 are coupled to USB host controller 203 through the "0" upstream ports of selection devices 211 and 213, respectively. Therefore, USB functions 215 and 217 may continue to communicate even though primary USB host controller 205 is deactivated.

To illustrate, USB function 215 in one embodiment may be an Ethernet communications interface and USB function 217 may be a modem interface. In this illustration, assume that USB host controller 205 has control of the USB functions and acts as a bridge between the two USB functions. In accordance with the teachings of the present invention, USB host controller 203 may be used to enable the flow of information in the event that USB host controller 205 is no longer able to act as a bridge between the USB functions. In one embodiment, if and when USB host controller 203 detects through link 221 that USB host controller 205 has been re-activated and may retake control of the USB, select signal 223 is updated accordingly such that USB host controller relinquishes control of the USB.

In one embodiment, an asynchronous cable disconnect from USB host controller 205 is emulated and an asynchronous cable reconnect to USB host controller 203 is emulated during the switching between USB host controller 205 and 203. In so doing, the downstream port of USB host controller 205 is presented with a USB disconnect state and the downstream port of USB host controller 203 is presented with a USB new bus state. In one embodiment, after USB host controller 203 is reconnected to take control of the USB, USB host controller 203 issues a USB reset and enumerates the bus. Thus, USB host controller 203 forces all USB peripherals 215 and 217 to be reset and introduce themselves over the bus according to the known USB protocol. Therefore, one embodiment of the present invention simulates USB peripherals 215 and 217 being physically disconnected from USB host controller 205 and being reconnected to USB host controller 203.

From the above description and drawings, it will be understood by those skilled in the art that the particular embodiment shown and described are for purposes of illustration only and are not intended to limit the scope of the invention. Those skilled in the art will recognize that the invention may be embodied in other specific forms without departing from the spirit or essential characteristics. References to details of particular embodiments are not intended to limit the scope of the claims.

What is claimed is:

1. A switching device, comprising:
   a first hub device coupled to a first host device;
   a second hub device coupled to a second host device;
   a first selection device coupled to a first peripheral device and the first and second hub devices, the first selection device to selectively couple the first peripheral device to one of the first and second host devices in response to a selection signal; and
   a second selection device coupled to a second peripheral device and the first and second hub devices, the second selection device to selectively couple the second peripheral device to said one of the first and second host devices in response to the selection signal.

2. The switching device described in claim 1 wherein the first host device is coupled to the second host device through a link.

3. The switching device described in claim 1 wherein the selection signal is generated in response to the first host device.

4. The switching device described in claim 1 wherein the first and second peripheral devices are selectively coupled to said one of the first and second host devices through the first and second hub devices according to a Universal Serial Bus (USB) protocol.

5. The switching device described in claim 2 wherein the first host device is further coupled to the second hub device such that the link comprises the second hub device.

6. A method for switching between a plurality of Universal Serial Bus (USB) host devices from being coupled to a USB peripheral device, the method comprising the steps of:

generating a host select signal; and switching an upstream port of the USB peripheral device from being coupled to a downstream port of a first USB hub device to a downstream port of a second USB hub device in response to the host select signal, wherein a first one of the USB host devices is coupled to an upstream port of the first USB hub device and a second one of the USB host devices is coupled to an upstream port of the second USB hub device.

7. The method described in claim 6 including the additional step of coupling together the first and second ones of the USB host devices through a link.

8. The method described in claim 7 wherein the host select signal is generated in response to the first one of the USB host devices.

9. The method described in claim 7 wherein the host select signal is generated in response to the second one of the USB host devices.

10. The method described in claim 6 wherein the following steps are performed during the switching step:

emulating an asynchronous cable disconnect from the first one of the USB host devices; and emulating an asynchronous cable reconnect to the second one of the USB host devices.

11. The method described in claim 6 wherein the following steps are performed during the switching step:

presenting the downstream port of the first one of the USB host devices a disconnect state; and presenting the downstream port of the second one of the USB host devices a new bus state.

12. The method described in claim 11 wherein the step of presenting the upstream port of the USB peripheral device the new bus state is performed during the switching step.

13. The method described in claim 6 including the additional step of issuing a USB reset command by the second one of the USB host devices to the USB peripheral device after the switching step.

14. The method described in claim 6 including the additional step of latching a signal received by the upstream port of the USB peripheral device.

15. A device adapted to be coupled to a Universal Serial Bus (USB), comprising:

a first USB hub device coupled to the first USB host device;

a second USB hub device coupled to the second USB host device;

a first selection device coupled to a first USB peripheral device and the first and second USB hub devices, the first selection device to selectively couple the first USB peripheral device to one of a first USB host device and a second USB host device in response to a selection signal; and a second selection device coupled to a second USB peripheral device and the first and second USB hub devices, the second selection device to selectively couple the second USB peripheral device to said one of the first and second USB host devices in response to the selection signal.

16. The device described in claim 15 wherein the first USB host device is coupled to the second USB host device through a link.

17. The device described in claim 15 wherein the selection signal is generated in response to the first USB host device.

18. The device described in claim 16 wherein the first USB host device is further coupled to the second USB hub device such that the link comprises the second USB hub device.

* * * * *